Figure 1:
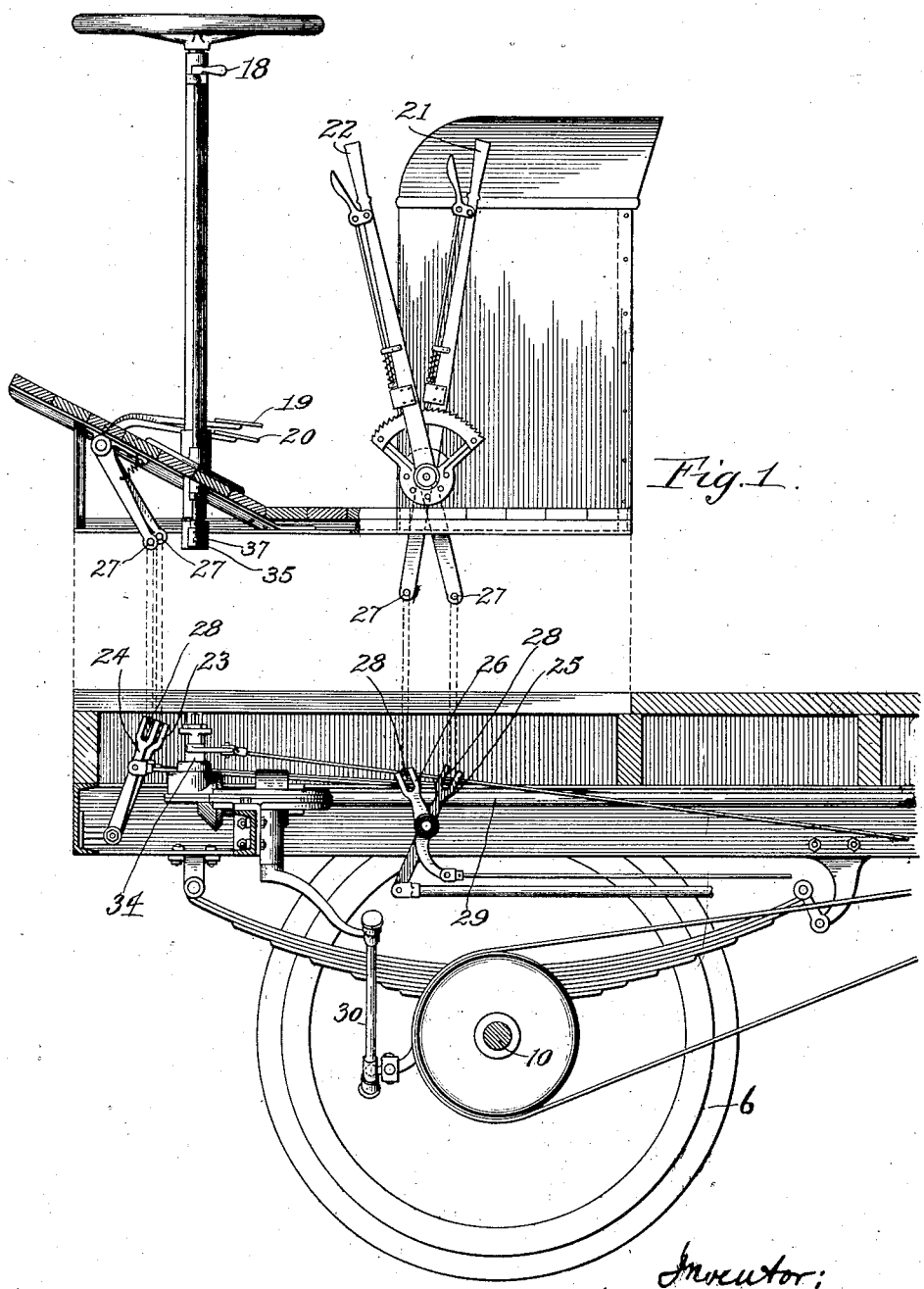

H. L. PARRISH.
AUTOMOBILE TRUCK.
APPLICATION FILED FEB. 28, 1908.

924,820.

Patented June 15, 1909.
3 SHEETS—SHEET 1.

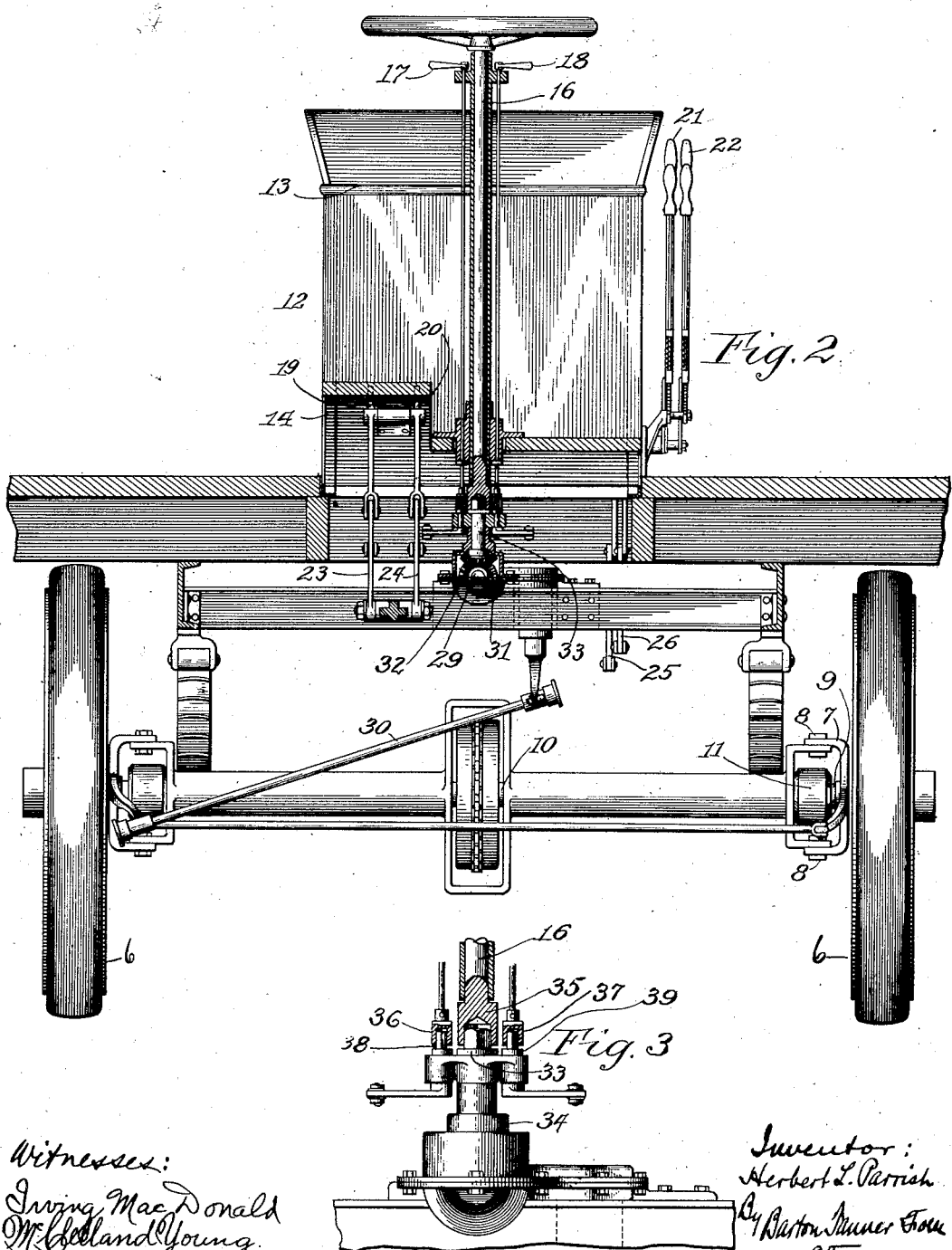

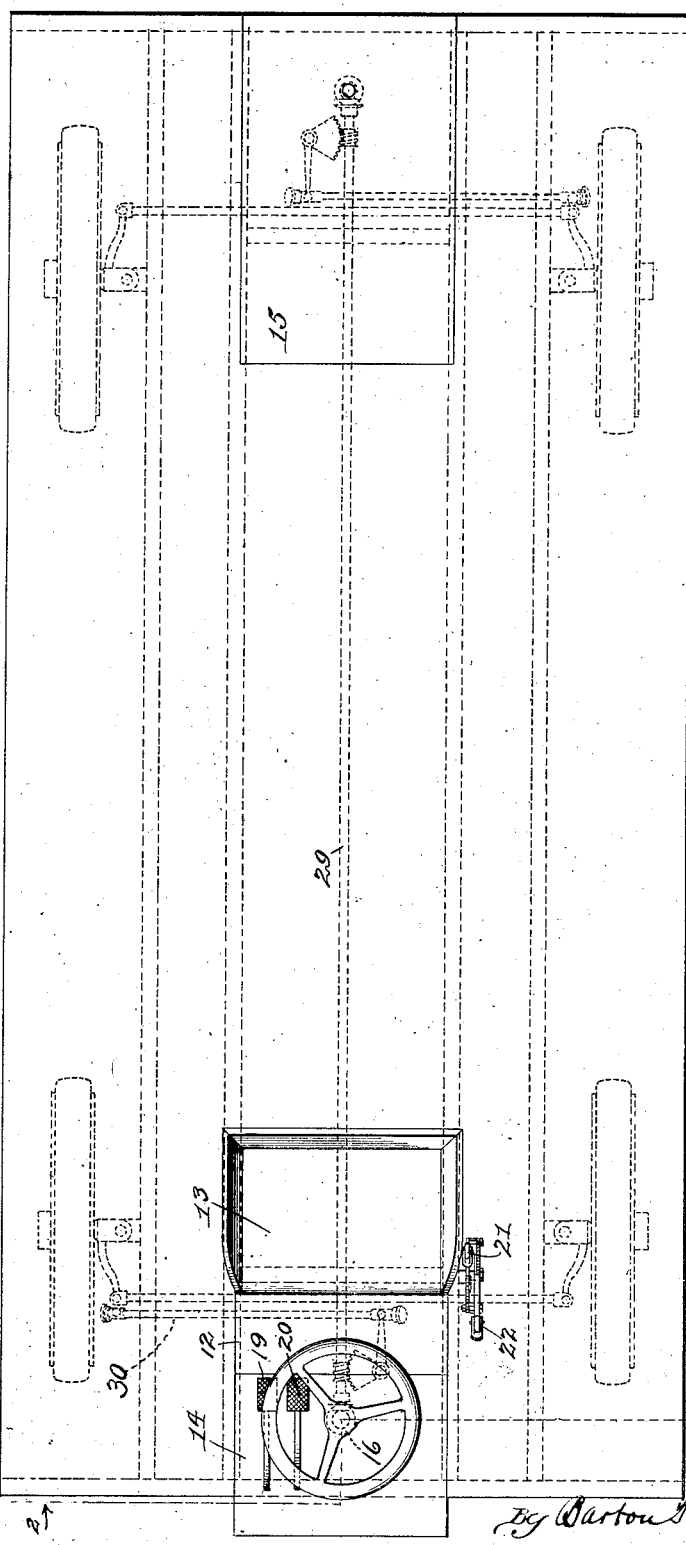

UNITED STATES PATENT OFFICE.

HERBERT L. PARRISH, OF BENTON HARBOR, MICHIGAN.

AUTOMOBILE-TRUCK.

No. 924,820.

Specification of Letters Patent.

Patented June 15, 1909.

Application filed February 28, 1908. Serial No. 418,224.

*To all whom it may concern:*

Be it known that I, HERBERT L. PARRISH, citizen of the United States, residing at Benton Harbor, in the county of Berrien and State of Michigan, have invented a certain new and useful Improvement in Automobile-Trucks, of which the following is a full, clear, concise, and exact description.

My invention relates to an automobile truck, and its object is to provide an improved vehicle of this class, in which either end may be treated as the forward end, and the vehicle controlled and steered therefrom. Such a vehicle will be of especial advantage in that forward running is possible both in approaching and leaving, end on, the place of loading or unloading, through narrow or crowded passages, which do not permit of the vehicle being turned around.

Briefly, the invention contemplates a double-ended automobile truck having a removable frame adapted to be placed at either end of the vehicle, said frame having an equipment of control apparatus, adapted for manipulation by the driver, and the vehicle having duplicate steering and operating levers at each end, adapted to be temporarily connected with corresponding handles or parts of the controlling apparatus carried by said removable frame, to be operated thereby. With such an arrangement, after running the vehicle in one direction from one end, the frame having the controlling apparatus may be picked up and removed to the opposite end, and the vehicle run in the opposite direction under control from the new location. In order to secure the fullest advantage of this arrangement, the vehicle is preferably arranged to have each of its four wheels positively driven and arranged to steer, the front and rear wheels swinging reciprocally from side to side in steering.

The accompanying drawings illustrate so much of the structure of an automobile truck as is necessary for an understanding of my invention, which is disclosed thereby.

Figure 1 is a longitudinal sectional view of one end of the truck, the removable seat frame, which carries the driver's controlling apparatus, being shown as lifted up from the truck bodily; Fig. 2 is a cross-sectional view of the end of the truck on line 2—2 of Fig. 4, the seat frame and controlling apparatus being in place; Fig. 3 is a detail sectional view on a larger scale, illustrating the construction by which the steering post, and the spark-control lever and throttle-lever, associated with the steering post, are detachably connected to corresponding parts or levers of one of the duplicate sets of steering and controlling mechanisms, which are permanently mounted upon the truck body, one set at each end thereof; Fig. 4 is a diagrammatic plan view of the truck, showing the duplicate sets of steering and controlling mechanisms at the ends thereof, and also illustrating the construction by which both sets of wheels may be turned reciprocally in steering, from either end of the vehicle.

Like parts are designated by similar characters of reference throughout the several views.

In the truck illustrated, each of the four wheels 6 has a swinging dead-axle carried by a yoke or hanger 7, which is pivoted at 8 to the forked end of an axle frame. The spindle 9 of each wheel, which extends through the dead axle, is connected to a driving-axle 10 through a universal coupling 11. Motive power from an engine of any desired type is applied to the driving-shaft 10 through any suitable transmission gear. As shown, the axle 10 carries a differential gear, which is chain-driven and the controlling apparatus is such as would be required for a gasolene motor of the ordinary type, with a suitable change speed gear.

While no particular form of transmission gear is essential to this invention, it will be apparent that for a vehicle designed to be run from either end considered as the forward end, the transmission should preferably be such as to give two or more speeds in each direction.

A seat frame 12, comprising a seat 13 and a foot-rest 14, is arranged to be set at either end of the truck, a rectangular opening or seat being provided in the floor of the car body at each end. When the seat frame 12 is set at one end, the opening in the floor at the other end is intended to be covered by a removable section 15 of the flooring, the seat frame and cover 15 being transposed to opposite ends of the truck when desired.

The controlling apparatus carried by the frame 12, and intended to be manipulated by the driver in controlling the vehicle, comprises, in the form shown, the steering post 16, having spark-control lever 17 and throttle-lever 18, mounted alongside of said steering post, two pedals 19 and 20 which may be for controlling the clutch and the main brake, respectively, and hand levers 21 and 22 at the side of the seat, which may be for controlling the change speed gear and the emergency brake, respectively. These various parts of the controlling apparatus, mounted upon the removable frame 12, are arranged to be detachably connected to corresponding permanent controlling parts provided in duplicate upon the body of the truck, one set at each of the ends thereof. Thus, the pedal levers 19 and 20 and the hand levers 21 and 22 are provided with arms which may be detachably coupled to the permanently-located clutch lever 23, brake lever 24, change-gear lever 25, and emergency brake lever 26, respectively, these permanently-located levers being connected to links which extend to the various parts to be controlled thereby. The detachable connection between the levers mounted upon the removable frame 12, and the permanently-located levers on the chassis, may be as illustrated, the arm of each lever on the removable frame having a pin 27 which is adapted to enter the slot 28 in the forked end of the corresponding permanent lever, so that when the frame is set in place, the levers in the chassis may be operated by a movement of the corresponding levers in the removable frame. The detachable connection of the steering post and the spark-control lever 17 and throttle-lever 18 associated therewith, to the corresponding parts in the chassis, may be as illustrated most clearly in Fig. 3.

The steering mechanism of the vehicle shown is controlled by a shaft 29, running longitudinally of the vehicle and connected with worm and sector gearing at each end which operates a drag link 30 connected to the steering knuckles of the wheels at the corresponding end. The rotation of the shaft 29 will, therefore, act through the worm and sector gearing at each end to turn the wheels from side to side and thus steer the vehicle, the gearing being so arranged that the front and rear wheels will swing reciprocally.

The steering post 16 on the removable frame 12 may be arranged to turn the shaft 29 and steer the vehicle by a connection therewith through bevel-gearing. The shaft 29 carries a bevel-gear 31 and a second bevel-gear 32, meshing with gear 31, is carried upon a short vertical steering shaft 33, mounted in a casting or framework 34, in the chassis. The upper end of the steering shaft 33 is arranged to be detachably coupled to the lower end of the steering post. As shown, the upper end of the shaft 33 has a squared head, over which a socket wrench or head 35 of the steering-post 16 is adapted to fit, the arrangement thus being such that when the steering post is in place, the turning of the steering gear will rotate the steering shaft 33 and will act through bevel-gears 32 and 31 to rotate the shaft 29, which in turn will operate through the worm and sector gearing at both ends of the vehicle, to turn the wheels to one side or the other, according to the direction of rotation of the front steering gear.

The connections for the spark-control levers 17 and throttle-levers 18 may be of a similar character, the lower ends of the rods or shafts for these levers, mounted upon the steering column being provided with wrench-socket heads 36, 37, respectively, which are adapted to fit over the squared heads of corresponding lever shafts 38, 39, mounted in the casting 34, these lever shafts 38, 39 carrying arms which are connected in the usual way through links to the spark timer and throttle of the motor.

It will be apparent that my invention is capable of modification, and that the ideas or novel features of construction set forth may be embodied in machines differing widely in specific details from the form herein shown.

Therefore, having described and set forth the principle of my invention, and the best mode in which I contemplate applying this principle, I claim:—

1. A double-ended automobile vehicle having a removable frame adapted to be placed at either end of the vehicle, said frame carrying controlling members adapted for manipulation by the driver, and duplicate operating connections at each end of the vehicle for said controlling members; whereby the vehicle may be controlled from either end.

2. A double-ended automobile truck having each of its wheels positively driven and arranged to steer, a removable seat-frame adapted to be placed at either end of the vehicle, said seat-frame carrying a set of controlling apparatus adapted for manipulation by the driver, and duplicate operating connections for said controlling apparatus at each end of the truck; whereby the seat-frame may be placed at either end of the truck, and the vehicle driven in either direction therefrom.

3. In an automobile truck having each of its wheels positively driven and arranged to steer, the combination with the body, of a removable frame carrying a seat and foot-rest, said frame being adapted to be set upon the body at either end thereof, a steering post having a spark-control lever and a throttle-lever mounted together therewith, upon said removable frame, a hand-lever at the side of the seat, and a pedal-lever upon the foot-rest, all carried by said removable frame, and duplicate operative connections in the body of the vehicle at each end thereof, with which said steering post and levers are adapted to be removably connected.

4. In an automobile truck, the combination with the body, of a steering-shaft set in the floor thereof and having connections for steering the vehicle, of a spark-control shaft and a throttle-shaft also set in the floor, and a removable frame adapted to be set upon the truck, said frame carrying a steering-post and controller-rods extending up alongside the steering-post, with handle levers at the upper ends thereof, for turning said rods, said steering post and controller rods being fitted with wrench-heads at their lower ends, adapted removably to engage the heads of the respective shafts set in the floor.

5. A double-ended automobile truck having each of its wheels positively driven and arranged to steer, a short steering shaft at each end of the truck, geared to steer the wheels, duplicate controller members also at each end of the truck, and a removable frame adapted to fit at either end of the truck, said frame carrying a steering-post adapted to engage and form an extension of the corresponding steering shaft, and hand levers adapted to be removably connected with the corresponding controller members.

In witness whereof, I, hereunto subscribe my name this 12th day of February, A. D. 1908.

HERBERT L. PARRISH.

Witnesses:
D. C. TANNER,
IRVING MACDONALD.